May 28, 1968     H. DEURING ETAL     3,385,082

TORSIONAL VIBRATION BALANCER

Filed Sept. 20, 1966

*Inventors*
Hans Deuring
Rolf Rocke &
Hans-Joachim Tolksdorf

By *Spencer & Kaye*

Attorneys

United States Patent Office 3,385,082
Patented May 28, 1968

3,385,082
TORSIONAL VIBRATION BALANCER
Hans Deuring, Burscheid, and Rolf Rocke and Hans-Joachim Tolksdorf, Opladen, Germany, assignors to Goetzewerke Friedrich Goetze A.G., Dusseldorf, Germany
Filed Sept. 20, 1966, Ser. No. 580,652
Claims priority, application Germany, Sept. 20, 1965, G 44,730; Oct. 1, 1965, G 44,823
10 Claims. (Cl. 64—27)

ABSTRACT OF THE DISCLOSURE

A torsional vibration balancer for use in a motor vehicle disc clutch having a central hub provided with arm portions and an outer two-piece housing provided with a plurality of recesses, the balancer essentially including a polygonal elastic element defining a plurality of columnar springs and a plurality of metal plates connected to the elements between alternate pairs of springs and rigidly connected to the housing, each hub arm portion being connected between a respective adjacent pair of springs at a point between two succeeding metal plates.

---

The present invention relates generally to a torsional vibration balancer, and particularly to a balancer for motor vehicle disc clutches.

The present invention is particularly concerned with a vibration balancer made of a polygonal elastic element, which is preferably of rubber, formed to define a plurality of columnar springs, each of which springs is connected between a hub and a housing defining the clutch.

In the power train of motor vehicles which are powered by internal combustion engines, torsional vibration balancers are generally constituted by elastic members disposed at some point between the engine and the gear mechanism. For this purpose, the hub portion of the clutch and the clutch disc of prior art devices are separated from one another and are connected together by way of tangentially-acting helical springs which permit an elastic transmission of torsional moments to be effectuated. This elastic transmission of the torsional moments, in addition to permitting the motor vehicle to be set in motion more smoothly, serves to damp the vibrations which are normally superimposed on the rotary movement. It has been found that springs made of an elastic material, such as rubber for example, are particularly well suited for damping such vibrations.

It has been proposed to constitute torsional vibration balancers of an elastic element and a two-piece housing enclosing the element. In these devices, the element is in the form of a polygonal ring and defines a plurality of columnar springs. Between the individual springs are disposed metallic parts, such as clamping sleeves for example, successive ones of which are connected alternately to the driving and to the driven part of the balancer. The driven part serves as a hub which is enclosed within the rubber element. Every other clamping sleeve may be replaced by an arm which is integral with, and extends radially from the hub. The remaining clamping sleeves, which may be embedded in the rubber element are connected with the housing by way of bolts or rivets.

In order to assure a prolonged service life and an improved damping action of the rubber springs, it is also known to impart a preliminary stress to the springs when placing them into the housing. To this end, the rubber element may initially be given a somewhat larger diameter than that required and may subsequently be compressed to the required diameter, during its installation into the housing, by means of a strap or hose clamp connected around the rubber element.

It has further been suggested to remove such clamping sleeves at the points of connection between the rubber element and the hub and to substitute therefor plate-like lug portions, or projections, which extend radially from the hub and which each extend between two adjacent springs.

In addition, it has also been suggested to rotatably position the clutch disc, i.e., the housing of the torsional vibration balancer, on the hub box in order to achieve a knockfree rotation of the clutch disc with respect to the hub. For this purpose, a sleeve of elastic material having good sliding properties may be positioned between the clutch disc and both the housing and the hub, thereby simultaneously reducing the wear occurring between the relatively slidable parts. For producing this type of centering, it is necessary to provide a separate sliding surface on the housing and, because such an arrangement requires an axially elongated hub box, the entire axial dimension of the balancer must be increased.

It is a primary object of the present invention to provide an improved torsional vibration balancer.

Another object of the present invention is to provide a simple and inexpensive connection between the rubber element and the housing and to eliminate the need for relatively complicated and expensive clamping sleeves and rivets or bolts for connecting the rubber element to the housing.

Another object of the present invention is to eliminate any axial projections beyond the housing of the torsional vibration balancer, such projections inherently existing when rivets or bolts were previously used for connecting the rubber element to the housing.

Another object of the present invention is to provide for a simplified centering of the hub with respect to the housing without requiring an enlargement of the axial dimensions of the housing.

These and other objects according to the present invention are achieved by the provision, in a motor vehicle disc clutch having a central hub provided with arm portions and an outer two-piece housing provided with a plurality of recesses, of a torsional vibration balancer including a polygonal elastic element defining a plurality of columnar springs, and a plurality of metal plates connected to the element between alternate pairs of such springs. Each plate has a pair of projecting lugs engaging associated housing recesses for securing the element to the housing. Each hub arm is connected between a respective adjacent pair of springs at a point between two succeeding metal plates for connecting the element to the hub, the element being pre-stressed during assembly of the clutch. As a result, the elastic element acts to elastically center the hub in the housing.

Additional objects and advantages of the present invention will become apparent upon consideration of the following description when taken in conjunction with the accompanying drawings in which.

Figure 1:
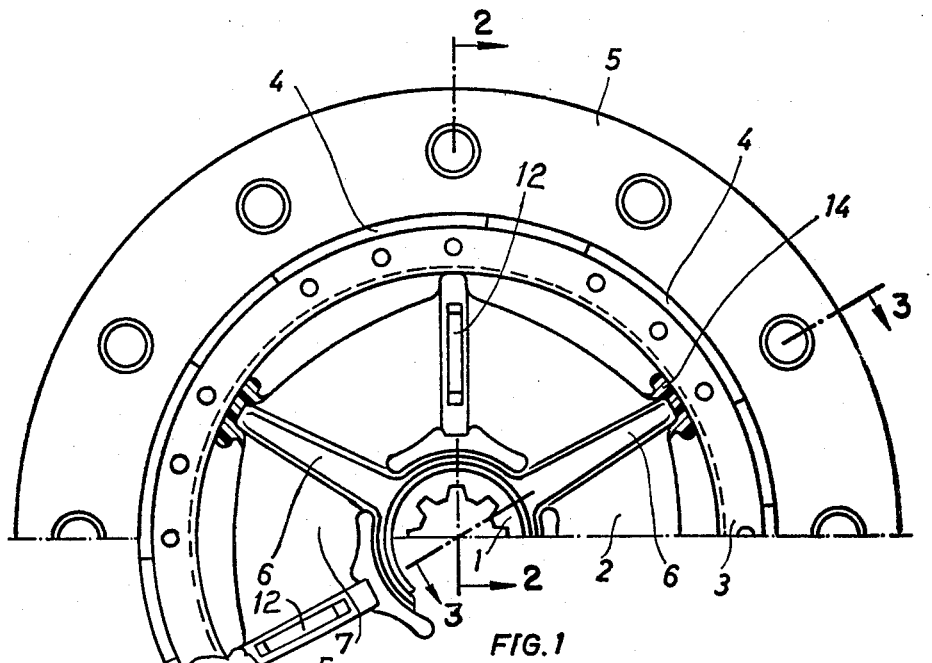
FIGURE 1 is a partial, axial cross-sectional view of a preferred embodiment of the present invention.

FIGURE 1 shows a torsional vibration balancer according to the present invention for motor vehicle disc clutches. The balancer generally includes a hub 1, a rubber element 2, a housing 3, spring plates 4, and clutch linings 5. A plurality, e.g., three, of radial arms 6 extend outwardly from hub 1 to a point just short of housing 3. Each of the arms 6 extends between a respective pair of columnar spring portions of the rubber element 2.

Interposed between each adjacent pair of arms 6 is a metallic plate 8 which also extends radially between two spring portions 7 of rubber element 2. Each of the plates 8 is rigidly connected to housing 3 in a manner which will be described in greater detail below in connection with FIGURE 2.

Spring plates 4 are disposed at the outer circumference of, and are riveted to housing 3, and clutch linings 5 are mounted on spring plates 4 by means of a plurality of circumferentially distributed rivets.

Figure 2:
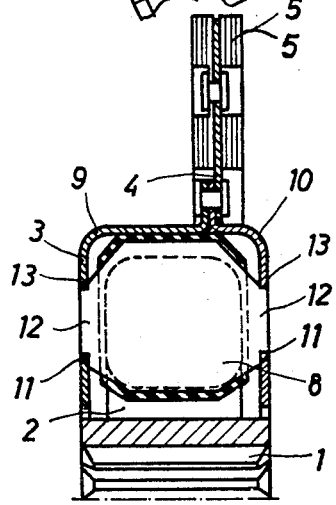
FIGURE 2 is a cross-sectional view taken along the plane defined by the line 2—2 of FIGURE 1.

FIGURE 2 shows the manner in which the rubber element 2 is connected to the housing 3 through the intermediary of plates 8. The housing 3 is made of two shell halves 9 and 10 each provided with a plurality of slots 11, each slot being provided for receiving the associated edge of a respective one of the plates 8. Two opposed edges of each plate 8 are provided with projections 12 arranged to etxend into their associated slots 11. Radial movement of the plates 8 is prevented by abutments 13 formed in members 9 and 10 and defining the edges of slots 11.

Rubber element 2 is formed with one hollow portion for each plate 8, each such hollow portion being provided with opposed openings for permitting the lugs 12 of its associated plate 8 to extend beyond rubber element 2 and into the slots 11 of housing 3. Rubber element 2 may either be originally molded around plates 8 or these plates may be inserted after the fabrication of element 2 by forcing them in through the openings in rubber element hollow portions. The plates 8 thus provide a rigid connection between the element 2 and housing 3. Plates 8 are preferably vulcanized to element 2.

Figure 3:
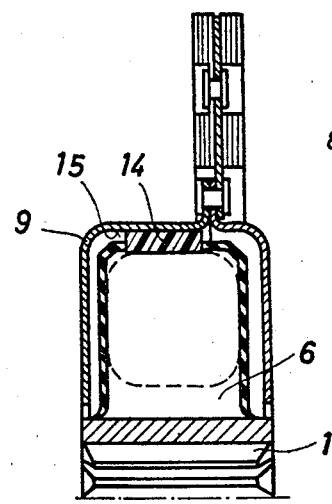
FIGURE 3 is a cross-sectional view taken along the plane defined by the line 3—3 of FIGURE 1.

Turning now to FIGURE 3, it may be seen that the rubber element 2 is fitted over each of the radial arms 6 so as to be spaced radially from the inner surface 15 of housing 3. The resulting space is bridged by a slidable element 14 disposed between the outer end of each arm 6 and the inner housing surface 15. This slidable element is preferably made of an elastically deformable plastic and is integrally connected to rubber element 2, preferably by vulcanization. When the assembly is in operation, element 14 is arranged to slide along and upon the surface 15.

The connection of the plates 8 to the housing 3 permits a transmission of the torsional moments, or torques, from the housing to the hub 1 through the intermediary of plates 8 and rubber element 2. Thus, each simple flat metal plate 8 replaces the two clamping sleeves and the bolts and rivets of the prior art clutch assemblies.

According to one of the principle novel advantages realized by the present invention, there is no longer any bolt head or rivet head projecting in an axial direction out of the torsional vibrational balancer housing.

The recesses into which the metal plates 8 project may be constituted either by slots or corrugations in the housing 3.

Figure 2A:
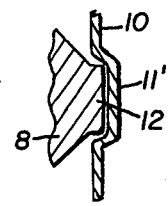
FIGURE 2a is a cross-sectional, detail view taken along the same plane as FIGURE 2 and showing a modified form of construction for one element of the arrangement shown in FIGURE 2.

FIGURE 2a is a detail view showing the housing shell half 10 provided with a corrugation 11' in which one projection of a plate 8 is securely held. Each shell half of the housing could be provided with such a corrguation for each of the metal plates 8.

It is desirable that such slots or corrugations be provided with suitable abutments, such as the abutments 13 of FIGURE 2, which prevent movement of the metal plates in a radial direction. Such an arrangement has the advantage of assuring that the rubber element 2, which was preliminarily stressed to its nominal diameter prior to assembly, will be maintained at this nominal diameter after it has been placed in the housing 3 and the disc clutch has been completely assembled.

As has been noted above, the rubber element 2 defines a plurality of columnar rubber spring portions 7 each of which has one end connected to a respective plate 8 and the other end connected to a respective radial arm 6. Each spring is thus arranged to experience tensile and compressive stresses in a lengthwise direction, i.e., in an angular direction about the axis of rotation of the clutch assembly. As may be seen from FIGURES 2 and 3, housing 3 is separated from hub 1 so that the only connection between the housing and the hub is by way of the slidable elements 14 and the spring portions 7.

The provision of elements 14, which are preferably made of a material which slides easily upon surface 15, permits a simple elastic centering of the hub to be achieved within the housing without requiring any axial enlargement of the housing. The precise shape of the slidable elements 14 is in no way critical to the practice of the present invention, it only being necessary that, when a relative movement occurs between the hub and the housing, these elements slide along the inner surface 15 of the housing without slipping off the ends of the hub arms 6. In order to maintain the elements 14 in proper position with respect to the arms 6, the elements are preferably integrally connected with element 2 by vulcanization, for example.

It would also be possible, in accordance with the present invention, to cut each of the elements 14 from a strip of a suitable material and to give the strip a cross-sectional configuration such that each slidable element can be permanently clipped in place over the end of its associated arm 6.

According to one important advantage offered by the present invention, the hub may be made of cast metals and need not have its outer surfaces subsequently machined or in any way finished. Any dimensional variations which may exist in the cast piece will be sufficiently compensated for by the slidable elements 14. Furthermore, an exact centering of the clutch disc and the clutch linings is not required when the clutch is manufactured according to the present invention.

It may thus be seen that the present invention provides a torsional vibration balancer whose manufacture and assembly are considerably simplified in comparison with the prior art. At the same time, by providing the lug projections according to the present invention, it is possible to pre-stress the rubber element during assembly without employing a hose clamp.

As a result, the additional recesses which had to previously be provided in the jacket surface of the housing of prior art clutches for removing such hose clamps are rendered unnecessary.

It will be understood that the above description of the present invention is susceptible to various modifications, changes, and adaptations, and the same are intended to be comprehended within the meaning and range of equivalents of the appended claims.

What is claimed is:

1. In a motor vehicle disc clutch having a central hub provided with arm portions and an outer two-piece housing provided with a plurality of recesses, a torsional vibration balancer comprising, in combination:

(a) a polygonal elastic element defining a plurality of columnar springs; and (b) a plurality of unitary metal plates connected to said element between alternate pairs of said springs, each said plate having a pair of projecting lugs for engaging associated housing recesses for securing said element to said housing;

(c) each said hub arm portion being connected between a respective adjacent pair of springs at a point between two succeeding metal plates for connecting said element to said hub, said element being, in its unstressed state, so dimensioned with respect to the dimensions of said hub and said housing that it will be pre-stressed during assembly of said clutch whereby said element acts to elastically center said hub in said housing.

2. An arrangement as defined in claim 1 wherein said housing recesses are constituted by slots.

3. An arrangement as defined in claim 1 wherein said housing is further provided with abutments against which said metal plates bear for preventing radial movement of said plates.

4. An arrangement as defined in claim 1 wherein said elastic element is made of rubber.

5. An arrangement as defined in claim 1 wherein said housing has an annular configuration having a U-shaped cross section which opens toward said hub, and said recesses are disposed on the walls defining the legs of said U-shaped configuration and extend in a radial direction.

6. An arrangement as defined in claim 1 wherein said housing recesses are constituted by corrugations in said housing.

7. In a motor vehicle disc clutch having a central hub provided with arm portions and an outer two-piece housing provided with a plurality of recesses, a torsional vibration balancer comprising, in combination:
 (a) a polygonyl elastic element defining a plurality of columnar springs;
 (b) a plurality of metal plates connected to said element between alternate pairs of said springs, each said plate having a pair of projecting lugs for engaging associated housing recesses for securing said element to said housing;
 (c) each said hub arm portion being connected between a respective adjacent pair of springs at a point between two succeeding metal plates for connecting said element to said hub, said element being pre-stressed during assembly of said clutch whereby said element acts to elastically center said hub in said housing; and
 (d) slidable elastic elements connected to said hub arm portions and bearing slidably against said housing.

8. An arrangement as defined in claim 7 wherein each of said slidable elements is made of an elastically deformable plastic having good sliding properties.

9. An arrangement as defined in claim 7 wherein each of said slidable elements is integrally connected to said elastic element.

10. In a motor vehicle disc clutch having a central hub provided with arm portions and an outer two-piece housing provided with a plurality of recesses, a torsional vibration balancer comprising, in combination:
 (a) a polygonal elastic element defining a plurality of columnar springs; and
 (b) a plurality of metal plates connected to said element between alternate pairs of said springs, each said plate having a pair of projecting lugs for engaging associated housing recesses for securing said element to said housing;
 (c) each said hub arm portion being connected between a respective adjacent pair of springs at a point between two succeeding metal plates for connecting said element to said hub, said element being pre-stressed during assembly of said clutch whereby said element acts to elastically center said hub in said housing;
 (d) said housing having an annular configuration having a U-shaped cross section which opens toward said hub, said recesses being disposed on the walls defining the legs of said U-shaped configuration and extending in a radial direction, and said elastic element being provided with a plurality of hollow portions each of which holds a respective one of said plates and each of which is disposed between a respective pair of said springs.

References Cited

UNITED STATES PATENTS

| | | | |
|---|---|---|---|
| 2,397,642 | 4/1946 | Blazek et al. | 64—27 X |
| 3,112,626 | 12/1963 | Barone | 64—11 |
| 3,148,756 | 9/1964 | Romanini | 64—27 |
| 3,238,742 | 3/1966 | Martorana | 64—11 |

HALL C. COE, *Primary Examiner.*